(12) United States Patent
Veikkolainen et al.

(10) Patent No.: US 9,781,759 B2
(45) Date of Patent: Oct. 3, 2017

(54) METHOD AND APPARATUS FOR OPERATING COMPANION DEVICE

(71) Applicant: Nokia Technologies Oy, Espoo (FI)

(72) Inventors: Simo Pekka Veikkolainen, Masala (FI); Vladimir Khokhlov, Rayleigh (GB); Zheng Xia, Beijing (CN); Christian Rossing Kraft, Beijing (CN)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 15/119,121

(22) PCT Filed: Feb. 17, 2014

(86) PCT No.: PCT/CN2014/072148
§ 371 (c)(1),
(2) Date: Aug. 15, 2016

(87) PCT Pub. No.: WO2015/120625
PCT Pub. Date: Aug. 20, 2015

(65) Prior Publication Data
US 2017/0064752 A1    Mar. 2, 2017

(51) Int. Cl.
*H04W 4/02* (2009.01)
*H04W 76/02* (2009.01)
*H04W 8/00* (2009.01)
*H04W 48/18* (2009.01)
*H04W 4/00* (2009.01)
*H04W 8/18* (2009.01)
*H04W 88/04* (2009.01)

(52) U.S. Cl.
CPC ......... *H04W 76/023* (2013.01); *H04W 4/008* (2013.01); *H04W 8/005* (2013.01); *H04W 8/183* (2013.01); *H04W 48/18* (2013.01); *H04W 76/028* (2013.01); *H04W 88/04* (2013.01)

(58) Field of Classification Search
CPC ...... H04R 1/1041; H04R 1/1008; H04R 1/32; H04M 1/6066; H04M 1/7253; H04M 1/73; A61B 5/0022; H04W 40/24; H04W 4/008; H04W 52/0209; H04W 88/06
USPC ............. 455/411, 41.2, 418, 569.1; 600/301; 370/350
See application file for complete search history.

(56) References Cited

U.S. PATENT DOCUMENTS

2005/0090226 A1   4/2005   Wolf
2006/0121960 A1   6/2006   Wang
(Continued)

OTHER PUBLICATIONS

International Search Report and Written Opinion received for corresponding Patent Cooperation Treaty Application No. PCT/CN2014/072148, dated Nov. 19, 2014, 12 pages.

*Primary Examiner* — Phuoc H Doan
(74) *Attorney, Agent, or Firm* — Mintz Levin Cohn Ferris Glovsky and Popeo, P.C.

(57) ABSTRACT

A method, corresponding apparatuses, and a non-transitory computer readable medium for operating a companion device and a companion device are provided. A method comprises detecting, at a companion device, presence of a primary device that is paired with the companion device according to at least one short-range radio communication technique. The method additionally comprises connecting the companion device to a cellular network upon detecting that the primary device is not present. With the claimed inventions, the battery life of the companion device can be extended.

11 Claims, 3 Drawing Sheets

(56) References Cited

U.S. PATENT DOCUMENTS

2006/0166716 A1    7/2006   Seshadri et al.
2012/0094602 A1    4/2012   Lee et al.
2013/0171965 A1*   7/2013   Schrecker ............ H04B 5/0006
                                                                                                          455/411

* cited by examiner

METHOD AND APPARATUS FOR OPERATING COMPANION DEVICE

RELATED APPLICATION

This application was originally filed as Patent Cooperation Treaty Application No. PCT/CN2014/072148 filed Feb. 17, 2014.

FIELD OF THE INVENTION

Example embodiments of the present disclosure generally relate to wireless communication techniques, including cellular communication techniques and short-range communication technique. More particularly, example embodiments of the present disclosure relate to a method and apparatus for operating a companion device, and a corresponding companion device.

BACKGROUND OF THE INVENTION

The following description of background art may include insights, discoveries, understandings or disclosures, or associations together with disclosures not known to the relevant art prior to the present disclosure but provided by the present disclosure. Some such contributions of the present disclosure may be specifically pointed out below, while other such contributions of the present disclosure will be apparent from their context.

Nowadays, in their daily life, more and more people use a pair of matched wireless communication devices for portable communication, in which one device may be a short-range communication enabled device, such as a Bluetooth device, while the other may be a cellular communication device, such as a mobile phone which has been embedded therein a Bluetooth chip to support the Bluetooth communication with the Bluetooth device. Since the Bluetooth devices generally have small sizes, they are more convenient and suitable for people to use in the physical exercise, such as jogging, or in driving, where the incoming calls from the cellular network can be answered by the Bluetooth device such as a Bluetooth headset or a Bluetooth enabled watch, via the mobile phones, which are not suitable for answering the call while walking, jogging, or driving due to greater size and less portability than the Bluetooth devices.

Although the above combining utilization of the Bluetooth device and cellular device provide great convenience for users, it does have some drawbacks. For example, since the Bluetooth devices generally cooperate with the cellular devices to access to the cellular network, the users would not connect to the cellular network if their mobile phones are not available. Further, even it is assumed that the Bluetooth device may be enabled to access to the cellular network, its battery life would be significantly decreased due to such access.

SUMMARY OF THE INVENTION

The following presents a simplified summary of the present disclosure in order to provide a basic understanding of some aspects of the present disclosure. It should be noted that this summary is not an extensive overview of the present disclosure and that it is not intended to identify key/critical elements of the present disclosure or to delineate the scope of the present disclosure. Its sole purpose is to present some concepts of the present disclosure in a simplified form as a prelude to the more detailed description that is presented later.

According to an aspect of the present disclosure, there is provided a method. The method comprises detecting, at a companion device, presence of a primary device that is paired with the companion device according to at least one short-range radio communication technique. The method also comprises connecting the companion device to a cellular network upon detecting that the primary device is not present.

In one embodiment, the method further comprises connecting the companion device to the primary device as a short-range hands-free accessory upon detecting that the primary device is present.

In another embodiment, the method further comprises detecting whether a short-range radio link between the companion device and the primary device is lost and connecting the companion device to the cellular network upon detecting that the short-range radio link is lost.

In yet another embodiment, the companion device has been connected to the cellular network and the method further comprises disconnecting the companion device from the cellular network.

In a further embodiment, the method further comprises detecting whether a short-range radio link between the companion device and the primary is lost and reconnecting the companion device to the cellular network upon detecting that the short-range radio link is lost.

In one embodiment, the connecting the companion device to the cellular network comprises using a subscriber identity module of the companion device to connect to the cellular network.

In another embodiment, wherein the at least one short-range radio communication technique is a Bluetooth technique.

According to an aspect of the present disclosure, there is provided an apparatus. The apparatus comprises at least one processor and at least one memory including computer program instructions. The memory and the computer program instructions are configured to, with the at least one processor, cause the apparatus at least to detect, at a companion device, presence of a primary device that is paired with the companion device according to at least one short-range radio communication technique. The memory and the computer program instructions are also configured to, with the at least one processor, cause the apparatus at least to connect the companion device to a cellular network upon detecting that the primary device is not present.

According to an aspect of the present disclosure, there is provided an apparatus. The apparatus comprises means for detecting, at a companion device, presence of a primary device that is paired with the companion device according to at least one short-range radio communication technique. The apparatus also comprises means for connecting the companion device to a cellular network upon detecting that the primary device is not present.

According to an aspect of the present disclosure, there is provided a non-transitory computer readable medium having program code stored thereon, the program code configured to direct an apparatus, when executed, to detect, at a companion device, presence of a primary device that is paired with the companion device according to at least one short-range radio communication technique. The program code is also configured to direct the apparatus, when executed, to connect the companion device to a cellular network upon detecting that the primary device is not present.

The aspects and embodiments of the present disclosure as described above may be utilized separately or in combination and different combining forms may be constituted to target at least some intentions of the present disclosure as mentioned in the following.

By virtue of the aspects and embodiments of the present disclosure, the battery lifetime of the companion device may be extended by operating as a Bluetooth handsfree accessory due to not having to maintain a cellular network connection while the primary device is present or available for the cellular connection. Further, due to the fact that both the primary and companion devices support cellular connections, access to the cellular network based on the presence of the primary device makes it more easy and possible for the user to have access to the cellular network.

BRIEF DESCRIPTION OF THE DRAWINGS

The embodiments of the present disclosure that are presented in the sense of examples and their advantages are explained in greater detail below with reference to the accompanying drawings, in which.

DETAILED DESCRIPTION OF EMBODIMENTS

Figure 1:
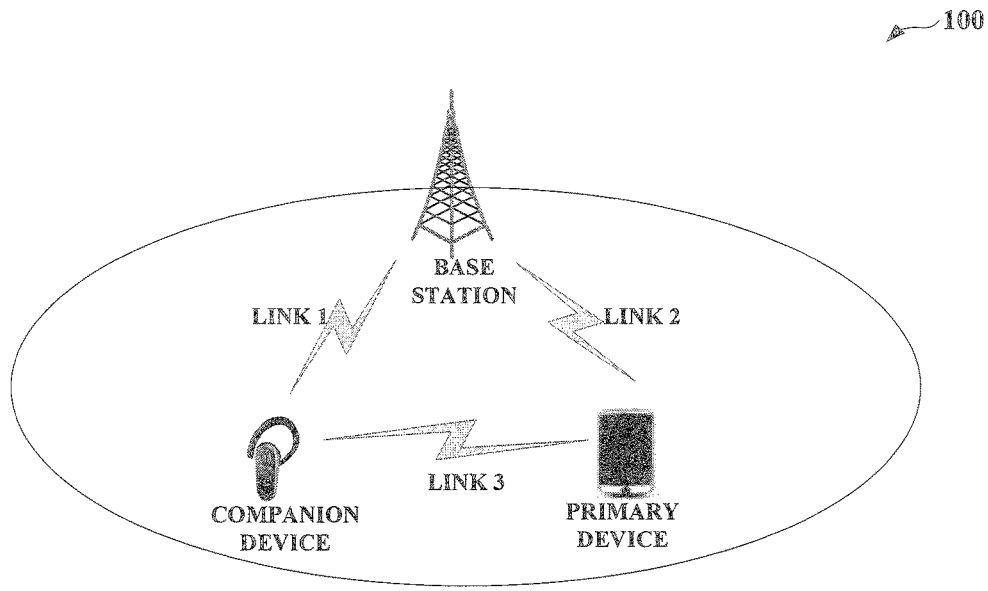
FIG. 1 illustrates an exemplary connectivity architecture in which embodiments of the present disclosure may be practiced.

The present disclosure will now be described more fully hereinafter with reference to the accompanying drawings, in which certain embodiments of the present disclosure are shown. This disclosure may, however, be embodied in many different forms and should not be construed as limited to the embodiments set forth herein; rather, these embodiments are provided by way of example so that this disclosure will be thorough and complete, and will fully convey the scope of the present disclosure to those skilled in the art. Like numbers refer to like elements throughout the specification.

Generally, all terms used in the claims are to be interpreted according to their ordinary meaning in the technical field, unless explicitly defined otherwise herein. For example, a companion device throughout the present disclosure may be a secondary or complementary device to a feature phone or a smart phone (primary device). A companion device may be envisaged to have a relatively long battery life, a small form, and limited features, typically supporting cellular voice and text messaging and possibly also cellular data if corresponding hardware or software is arranged. The companion device may be expected to be used instead of the primary device in cases where the primary device is considered to be too bulky or precious for the occasions. The companion device could automatically adapt to the current environment. For example, if the primary device and companion device are within a range of a low power radio, the companion device may be turned into a Bluetooth handsfree device, consuming less power than when operating as a standalone phone device for cellular access.

Further, the primary device throughout the present disclosure may be any type of mobile terminals, such as a mobile handset, a multimedia tablet, a laptop computer, a notebook computer, a netbook computer, a tablet computer, a personal communication device (PCS) device, which may connect to the companion device according to at least one short-range wireless communication technique, such as a Bluetooth technique.

Additionally, the cellular network throughout the present disclosure may refer to any existing cellular communication standards or specifications or future developed cellular standards or specifications. The existing cellular standards may include but are not limited to one of the 3GPP-standardized mobile communication networks, such as, for example, Long Term Evolution (LTE), an LTE-Advanced (LTE-A), a Universal Mobile Telecommunication System (UMTS) or a UMTS Terrestrial Radio Access network (UTRAN), an Evolved-UTRAN (E-UTRAN), a Global System for Mobile Communication (GSM) or Enhanced Data Rates for GSM Evolution (EDGE) network, a GSM/EDGE Radio Access Network (GERAN), or generally an Orthogonal Frequency Division Multiple Access (OFDMA) network.

All references to "a/an/the element, apparatus, component, means, or step" are to be interpreted openly as referring to at least one instance of the element, apparatus, component, means, or step unless explicitly stated otherwise. The steps of any method disclosed herein do not have to be performed in the exact order disclosed, unless explicitly stated. The discussion above and below in respect of any of the aspects of the present disclosure is also in applicable parts relevant to any other aspect of the present disclosure.

According to example embodiments of the present disclosure, the detection of a nearby mobile (primary) device is used as a trigger to initiate a detachment or disconnection procedure in the companion device from the cellular network, and connect to the mobile device as a Bluetooth hands-free accessory. Further, the detection of a link loss of the short-range radio link between the companion device and the primary device may be used as a trigger to initiate an attachment procedure to the cellular network in the companion device, by, for example, using SIM credentials in the companion device. The following will discuss the details of the embodiments of the present disclosure with reference to the accompanying drawings.

FIG. 1 illustrates an exemplary connectivity architecture 100 in which embodiments of the present disclosure may be practiced. As illustrated in FIG. 1, the architecture 100 comprises one companion device, which is embodied as a Bluetooth headset, and one primary device, which is embodied as a mobile phone, where the companion device and the primary device may connect to each other via a short-range wireless link 3 according to a corresponding short-range communication technique. Further illustrated in FIG. 1 is a base station which provides the companion and primary devices with cellular coverage exemplarily shown as an ellipse. In other words, if desired by the user, the base station would establish cellular communication with one of the companion device and primary device, via a respective wireless link 1 or 2.

It should be noted that the primary device and the companion devices as illustrated herein are only for exemplary purposes and there could be a number of primary devices and respective companion devices within the coverage area of the base station depending upon the coverage capability of the base station. Further, depending on different implementations, there may be additional entities in the architecture 100 which are not illustrated for simplification purposes. For example, an MME/S-GW entity may connect with the base stations (for example, NodeBs or evolved NodeBs) so as to connect the primary devices to the core network and forward the data between the base station and core network.

Figure 2:
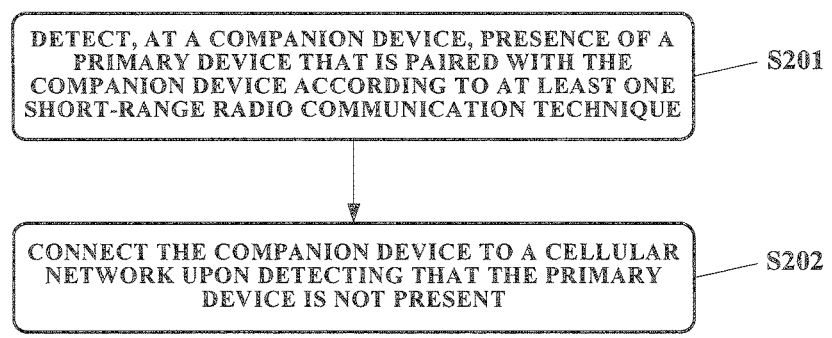
FIG. 2 is a flow chart schematically illustrating a method for operating a companion device, according to an embodiment of the present disclosure.

FIG. 2 is a flow chart schematically illustrating a method 200 for operating a companion device, according to example embodiments of the present disclosure. As illustrated in FIG. 2, at S201, the method 200 detects, at a companion device, presence of a primary device that is paired with the companion device according to at least one short-range radio communication technique. As previously noted, the companion device herein may be any suitable short-range communication device that could be pre-paired with the primary device, such as a Bluetooth headset or watch. At S202, the method 200 connects the companion device to a cellular network upon detecting that the primary device is not present.

According to some example embodiments, the method 200 may further comprise connecting the companion device to the primary device as a short-range hands-free accessory (for example, a headset or watch) upon detecting that the primary device is present. In another example, the method 200 may further comprise detecting whether a short-range radio link between the companion device and the primary device is lost and connecting the companion device to the cellular network upon detecting that the short-range radio link is lost.

In some example embodiments, the companion device has been connected to the cellular network and the method further comprises disconnecting the companion device from the cellular network. In this manner, the case in which two devices are accessing to the cellular network is avoided and thereby the battery life of the companion device could be extended.

In some example embodiments, the method 200 may further comprise detecting whether a short-range radio link between the companion device and the primary is lost and reconnecting the companion device to the cellular network upon detecting that the short-range radio link is lost. This could take place in a scenario where the companion device and the primary device are physically separated from each other to a degree that the short-range link between them cannot be maintained, for example, by several tens of meters. Once the companion device is carried by the user and cellular connection seems needed, the companion device would initiate an attachment procedure according to the cellular techniques, such as a random access procedure, to connect to the cellular network. This attachment procedure could be triggered as a default mode in the companion device or can be manually triggered.

In some example embodiments, the connecting the companion device to the cellular network may comprise using a subscriber identity module of the companion device to connect to the cellular network. With a separate subscriber identity module from the primary device and its subscription, the cellular connection initiated by the companion device according to the present disclosure may not involve or rely on the subscription in the primary device. In another example embodiment, the at least one short-range radio communication technique is a Bluetooth technique.

With the method 200 and its variants as discussed above in the various embodiments, which may be carried out by the companion device, simultaneous access to the cellular network by both the primary device and the companion device could be avoided and therefore the wireless communication resource could be saved. Further, since access to the cellular network by the companion device may be suspended if the primary device is in use, the battery life of the companion device could be extended. Additionally, the users may be given a choice of selecting which one of the primary device and companion device to access to the cellular wireless services, for example, dependent on his or her preference or context or environment he or she involves.

Since there would be two sets of subscriber identity modules and respective subscriptions according to the example embodiments of the present disclosure, a common problem with multi-SIM subscriptions may be confronted, which is that call logs and messages of the devices are not synchronized. For example calls answered or text messages read from one device will appear as missed calls or unread messages on the other device. Example embodiments of the present disclosure may therefore make use of a communications protocol for call log synchronization. Also the device operating system ("OS") may also provide application program interfaces ("APIs") for manipulating call logs and message storage. Such integration is possible in many smart phones today, for example, as demonstrated by Skype call logs integrated with the normal call logs. This kind of sync protocol could be run over the Bluetooth Generic Attribute Protocol, or over the cellular data if supported on the companion device.

Figure 3:
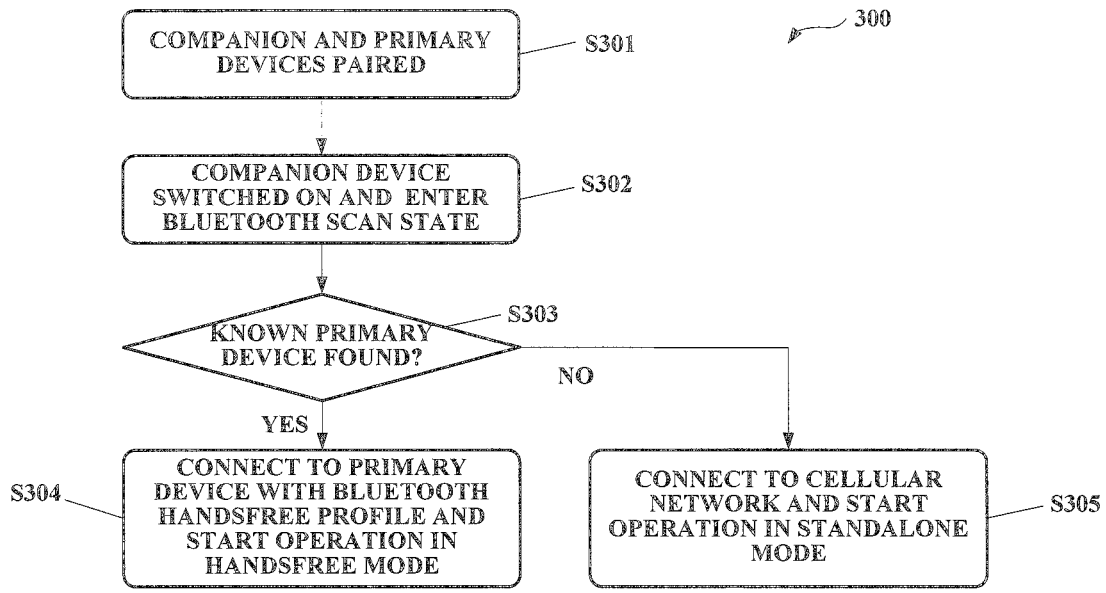
FIG. 3 is a flow chart schematically illustrating a method for operating a companion device, according to an embodiment of the present disclosure.

FIG. 3 is a flow chart schematically illustrating a method 300 for operating a companion device, according to example embodiments of the present disclosure. As illustrated in FIG. 3, at S301, the method 300 pairs the companion device with the primary device. This pairing operation may be carried out in a conventional manner. For example, the user may initiate the Bluetooth scanning procedure and therefore the primary device may start scanning the nearby companion device. Once the companion device is found, for example, the identity of the companion device is shown on the display of the primary device, the user is prompted to enter a password as provided by the companion device and therefore the pairing procedure is completed.

At S302, the method 300 switches on the companion device at some time after the initial pairing operation and enables the companion device to enter into a Bluetooth scan state. In other words, the companion device starts to scan for the previously-paired primary device using the normal Bluetooth scan procedure. At S303, the method 300 determines whether a known primary device is found. If this is the case, at S304 the method 300 connects the companion device to the primary device as, for example, a Bluetooth headset using Bluetooth handsfree profile. If this is not the case, then at S305 the method 300 connects the companion device to the cellular network using the procedures specified for the cellular network at issue. Thereafter, the companion device is operating in a standalone mode to provide the cellular access for the user.

According to some example embodiements, the companion device is connected with the cellular network and then moves near the primary device. The companion device may perform periodic Bluetooth page scan procedures and the primary device may also perform the paging of known devices. Once the primary device is found, as discussed above, the companion device connects to the primary device as a Bluetooth headset using the Bluetooth handsfree profile and detaches from the cellular network using the procedures defined for the cellular network in question. While the companion device is connected over the Bluetooth, the phone book access profile may be used for dialing based on names and displaying incoming caller's name. Similarly, a messaging access protocol may be used to send/receive text messages, as in many Bluetooth car kits today.

It can be seen from the above, the access to the cellular network according to the example embodiments of the present disclosure is very flexible and therefore the users have more freedom to select which device they desire for the cellular access. Further, using the primary device, if present, for the cellular communication may also relieve the pressure of the companion device in terms of a battery life and processing capability.

Figure 4:
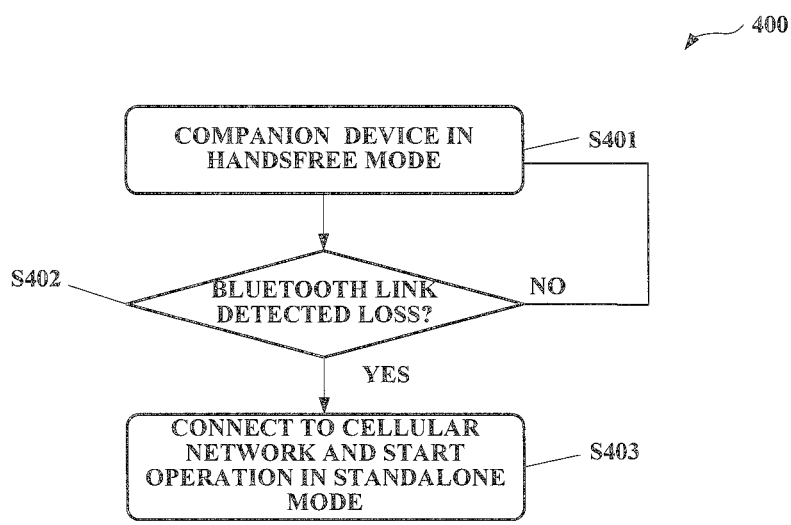
FIG. 4 is a flow chart schematically illustrating a method for operating a companion device according to another embodiment of the present disclosure.

FIG. 4 is a flow chart schematically illustrating a method 400 for operating a companion device according to another example embodiment of the present disclosure. As illustrated in FIG. 4, at an initial S401, the companion device may be short-range connected with the primary device, for example, in a hands-free node. At S402, the method 400 determines whether the Bluetooth link still exists between the companion device and the primary device. For example, a Bluetooth link management protocol may be applied to decide whether the Bluetooth link has been lost. If this is the case, at S403, the method 400 connects the companion device to the cellular network and therefore the companion device may start operations in a standalone mode. For example, the companion device attaches to the cellular network using the procedures defined for the cellular network in question. If the answer at S402 is "NO," then at S401 the companion device stays in the handsfree mode as a Bluetooth handsfree accessory.

Figure 5:
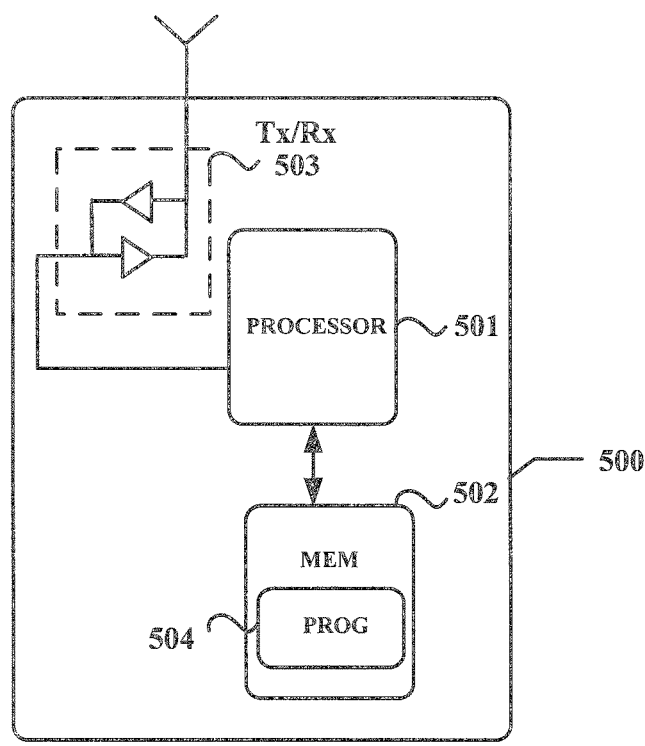
FIG. 5 is a simplified schematic block diagram illustrating a representative apparatus according to an embodiment of the present disclosure.

FIG. 5 is a simplified schematic block diagram illustrating a representative apparatus 500 according to some example embodiments of the present disclosure. As illustrated in FIG. 5, the apparatus 500 includes at least one processor 501, such as a data processor, at least one memory (MEM) 502 coupled to the processor 501, and a suitable RF transmitter TX and receiver RX 503 coupled to the processor 501. The MEM 502 stores a program (PROG) 504. The TX/RX 503 is for bidirectional wireless communications. Note that the TX/RX 503 has at least one antenna to facilitate communication, though in practice an apparatus will typically have several for for example, the MIMO communication.

The PROG 504 is assumed to include instructions that, when executed by the processor 501, enable the apparatus 500 to operate in accordance with the exemplary embodiments of the present disclosure, as discussed herein with the methods 200-400. For example, the apparatus 500 may be embodied as a companion device or a part thereof to carry out the methods 200-400.

In general, embodiments of the present disclosure may be implemented by computer software executable by at least one processor 501 of the apparatus 500, or by hardware, or by a combination of software and hardware.

The MEM 502 may be of any type suitable to the local technical environment and may be implemented using any suitable data storage technology, such as semiconductor based memory devices, magnetic memory devices and systems, optical memory devices and systems, fixed memory and removable memory, as non-limiting examples. While only one MEM is shown in the apparatus 500, there may be several physically distinct memory units in the apparatus 500. The processor 501 may be of any type suitable to the local technical environment, and may include one or more of general purpose computers, special purpose computers, microprocessors, digital signal processors (DSPs) and processors based on multicore processor architecture, as non limiting examples. The apparatus 500 may have multiple processors, such as for example an application specific integrated circuit chip that is slaved in time to a clock which synchronizes the main processor.

According to some example embodiments, the at least one memory and computer program instructions are configured to, with the at least one processor, cause the apparatus 500 further to connect the companion device to the primary device as a short-range hands-free accessory upon detecting that the primary device is present. In another example embodiment, the at least one memory and computer program instructions are configured to, with the at least one processor, cause the apparatus 500 further to detect whether a short-range radio link between the companion device and the primary device is lost and connect the companion device to the cellular network upon detecting that the short-range radio link is lost.

In an example embodiment, the companion device has been connected to the cellular network, and the at least one memory and computer program instructions are configured to, with the at least one processor, cause the apparatus 500 further to disconnect the companion device from the cellular network.

In another example embodiment, the at least one memory and computer program instructions are configured to, with the at least one processor, cause the apparatus 500 further to detect whether a short-range radio link between the companion device and the primary is lost and reconnect the companion device to the cellular network upon detecting that the short-range radio link is lost.

In an example embodiment, the at least one memory and computer program instructions are configured to, with the at least one processor, cause the apparatus 500 to use a subscriber identity module of the companion device to connect to the cellular network.

Figure 6:
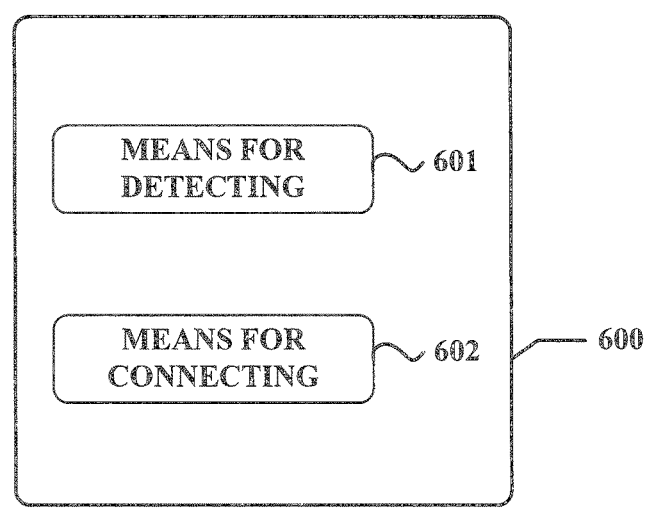
FIG. 6 is a simplified schematic block diagram illustrating a representative apparatus according to another embodiment of the present disclosure.

FIG. 6 is a simplified schematic block diagram illustrating a representative apparatus 600 according to another example embodiment of the present disclosure. As illustrated in FIG. 6, the apparatus 600 comprises means for detecting 601, at a companion device, presence of a primary device that is paired with the companion device according to at least one short-range radio communication technique. The apparatus 600 further comprises means for connecting 602 the companion device to a cellular network upon detecting that the primary device is not present.

According to some example embodiments, the apparatus 600 further comprises means for connecting the companion device to the primary device as a short-range hands-free accessory upon detecting that the primary device is present. In another example embodiment, the apparatus 600 further comprises means for detecting whether a short-range radio link between the companion device and the primary device is lost and means for connecting the companion device to the cellular network upon detecting that the short-range radio link is lost.

In an example embodiment, the companion device has been connected to the cellular network and the apparatus 600 further comprises means for disconnecting the companion device from the cellular network. In another example embodiment, the apparatus 600 further comprises means for detecting whether a short-range radio link between the companion device and the primary is lost and means for reconnecting the companion device to the cellular network upon detecting that the short-range radio link is lost. In a further example embodiment, the means for connecting 602 the companion device to the cellular network comprises means for using a subscriber identity module of the companion device to connect to the cellular network. In an additional example embodiment, the at least one short-range radio communication technique is a Bluetooth technique.

It is to be understood that the apparatus 600 is able to carry out the methods 200-400 according to the embodiments of the present disclosure and may be embodied as another form of a companion device or a part thereof.

The techniques described herein may be implemented by various means so that an apparatus implementing one or more functions of a corresponding mobile entity described with an embodiment comprises not only prior art means, but also means for implementing the one or more functions of a corresponding apparatus described with an embodiment and it may comprise separate means for each separate function, or means may be configured to perform two or more functions. For example, these techniques may be implemented in hardware (one or more apparatuses), firmware (one or more apparatuses), software (one or more modules), or combinations thereof. For a firmware or software, implementation can be through modules (for example, procedures, functions, and so on) that perform the functions described herein. The software codes may be stored in any suitable, processor/computer-readable data storage medium(s) or memory unit(s) or article(s) of manufacture and executed by one or more processors/computers. The data storage medium or the memory unit may be implemented within the processor/computer or external to the processor/computer, in which case it can be communicatively coupled to the processor/computer via various means as is known in the art.

Many modifications and other embodiments of the disclosures set forth herein will come to mind to one skilled in the art to which these embodiments of the disclosure pertain having the benefit of the teachings presented in the foregoing descriptions and the associated drawings. Therefore, it is to be understood that the embodiments of the disclosure are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method, comprising:
    detecting, at a companion device, a presence of a primary device, the presence of the primary device being detected by at least performing a scan in accordance with a short-range radio communication technique;
    in response to detecting that the primary device is present:
        connecting the companion device to the primary device in accordance with the short-range radio communication technique; and
        disconnecting the companion device from a cellular network; and
    in response to detecting that the primary device is not present, connecting the companion device to the cellular network.

2. The method according to claim 1, wherein the companion device is connected to the primary device as a short-range hands-free accessory in response to detecting that the primary device is present.

3. The method according to claim 2, further comprising:
    detecting whether a short-range radio link between the companion device and the primary device is lost; and
    connecting the companion device to the cellular network upon detecting that the short-range radio link is lost.

4. The method according to claim 1, wherein the connecting the companion device to the cellular network comprises using a subscriber identity module of the companion device to connect to the cellular network.

5. The method according to claim 1, wherein the at least one short-range radio communication technique is a Bluetooth technique.

6. An apparatus, comprising:
    at least one processor; and
    at least one memory including compute program instructions,
    wherein the at least one memory and computer program instructions are configured to, with the at least one processor, cause the apparatus at least to:
        detect a presence of a primary device, the presence of the primary device being detected by at least performing a scan in accordance with a short-range radio communication technique;
        in response to detecting that the primary device is present:
            connect the apparatus to the primary device in accordance with the short-range radio communication technique; and
            disconnect the apparatus from a cellular network; and
        in response to detecting that the primary device is not present, connect the apparatus to the cellular network.

7. The apparatus according to claim 6, wherein the apparatus is connected to the primary device as a short-range hands-free accessory in response to detecting that the primary device is present.

8. The apparatus according to claim 7, wherein the apparatus is further caused to at least:
    detect whether a short-range radio link between the apparatus and the primary device is lost; and
    connect the apparatus to the cellular network upon detecting that the short-range radio link is lost.

9. The apparatus according to claim 6, wherein the apparatus uses a subscriber identity module of the apparatus to connect to the cellular network.

10. The apparatus according to claim 6, wherein the at least one short-range radio communication technique is a Bluetooth technique.

11. A non-transitory computer readable medium having program code stored thereon, the program code configured to direct an apparatus, when executed, to:
    detect a presence of a primary device, the presence of the primary device being detected by at least performing a scan in accordance with a short-range radio communication technique;
    in response to detecting that the primary device is present:
        connect the apparatus to the primary device in accordance with the short-range radio communication technique; and
        disconnect the apparatus from a cellular network; and
    in response to detecting that the primary device is not present, connect the apparatus to the cellular network.

* * * * *